US012592841B2

(12) United States Patent
Sonawane et al.

(10) Patent No.: US 12,592,841 B2
(45) Date of Patent: Mar. 31, 2026

(54) ACTIVE-ACTIVE REPLICATION IN BLOCKCHAIN TABLES WITH PRIMARY KEY CONSTRAINTS

(71) Applicant: Oracle International Corporation, Redwood Shores, CA (US)

(72) Inventors: Sachin Vijakumar Sonawane, Foster City, CA (US); Mahesh Baburao Girkar, Los Altos, CA (US); Mahesh Subramaniam, Foster City, CA (US); Aurosish Mishra, Foster City, CA (US); Diego Ramirez, Guadalajara (MX); Lewis Kaplan, Los Angeles, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/646,252

(22) Filed: Apr. 25, 2024

(65) Prior Publication Data

US 2025/0310132 A1 Oct. 2, 2025

Related U.S. Application Data

(60) Provisional application No. 63/573,436, filed on Apr. 2, 2024.

(51) Int. Cl.
| | |
|---|---|
| *H04L 9/00* | (2022.01) |
| *H04L 9/08* | (2006.01) |
| *H04L 9/32* | (2006.01) |

(52) U.S. Cl.
CPC .............. *H04L 9/50* (2022.05); *H04L 9/0816* (2013.01); *H04L 9/3297* (2013.01)

(58) Field of Classification Search
CPC .......... H04L 9/50; H04L 9/816; H04L 9/3297
(Continued)

(56) References Cited

U.S. PATENT DOCUMENTS

| | | | | |
|---|---|---|---|---|
| 9,785,369 | B1 * | 10/2017 | Ateniese ............... | G06F 3/0659 |
| 11,239,999 | B1 * | 2/2022 | Winarski .................. | H04L 9/12 |

(Continued)

OTHER PUBLICATIONS

"Introduction to Workspace Manager", Oracle Database, available: https://docs.oracle.com/en/database/oracle/oracle-database/23/adwsm/introduction-to-workspace-manager.html#GUID-CF637BD7-E00C-4495-8D83-B9C805E3BBE1, retreived Jan. 31, 2024.

*Primary Examiner* — Meng Vang
(74) *Attorney, Agent, or Firm* — Hickman Becker Bingham Ledesma LLP

(57) ABSTRACT

Disclosed herein are various approaches for supporting active-active replication in a blockchain table having a primary key constraint. A blockchain database object may be stored in a first database, the blockchain database object comprising a field defined as a primary key for the database object and a visibility field. A first row may be inserted in the database object, the first row comprising a particular value for the field designated as the primary key. A primary key value conflict may be detected between the first row and a second row from a second database, the second row comprising the particular value for the field defined as the primary key. A conflict resolution procedure may be implemented to determine that the first row is a winning row of the primary key value conflict between the first row and the second row. A visibility field may be stored within the second row to indicate that the second row does not represent a valid row with respect to the primary key.

20 Claims, 5 Drawing Sheets

(58) Field of Classification Search
USPC .......................................................... 380/278
See application file for complete search history.

(56)                     References Cited

U.S. PATENT DOCUMENTS

| 2020/0387367 A1* | 12/2020 | Eklund | ................. | H04L 9/0825 |
| 2022/0198441 A1* | 6/2022 | Dalton | ................. | G06Q 20/227 |
| 2024/0181987 A1* | 6/2024 | Stefanovski | ....... | G07C 9/00309 |
| 2024/0356749 A1* | 10/2024 | Chiazor | ................. | G06F 40/30 |

* cited by examiner

303

Insert First Row into First Blockchain Table of First Database

306

Insert Second Row into Second Blockchain Table of Second Database

309

Replicate Insertion of Second Row in First Blockchain Table

312

Detect Conflict Between First Row and Second Row

315

Resolve Conflict between First Row and Second Row

318

Update Visibility Field of Losing Row

ACTIVE-ACTIVE REPLICATION IN BLOCKCHAIN TABLES WITH PRIMARY KEY CONSTRAINTS

RELATED APPLICATION DATA AND CLAIM OF PRIORITY

This application claims the benefit of U.S. Provisional Application No. 63/573,436, filed Apr. 2, 2024, the contents of which are incorporated by reference for all purposes as if fully set forth herein.

TECHNICAL FIELD

The present disclosure relates to active-active replication of blockchain tables.

BACKGROUND

In active-active replication of a database table across multiple database management systems (DBMSs), changes to rows in the database table may be initiated at any of the DBMSs. The rows of the database table are logically replicated across the DBMSs. Each DBMS inserts a row into its own copy of the database table, and a replication environment replicates these inserted rows across the other source database(s). Rows that have the same primary key value in the copies of the database table are a copy of the same row. The DBMS that originally inserts a row is referred to herein as a source DBMS; a DBMS at which insert of the row is replicated is referred to herein as a destination DBMS.

It is possible that two DBMSs, acting as source DBMSs for respective rows having the same primary key value, may insert the row into their copy of the database table. When one DBMS replicates the row from the other and attempts to insert the row, a primary key conflict is detected. When a primary key conflict is detected, a DBMS follows a conflict protocol to, in effect, insert only one version of the row. For example, a DBMS detects a primary key conflict when inserting a row to replicate from a source DBMS. If the row was inserted later at the source DBMS, the destination DBMS treats the insert as an update. Otherwise, the destination DBMS foregoes the insert. As a result, both the source and destination DBMS will store the same copy of the row.

But in the case of blockchain tables, once inserted rows are committed, they cannot be modified or deleted (or, in some cases, deleted only using a special application programming interface (API)). Users of blockchain technology rely on cryptographic security provided within blockchain ledgers. To support blockchain technology, a DBMS may include blockchain tables. A blockchain table contains rows that are chained through cryptographic hashes based on a previous row hash and current row content. All rows in the blockchain table are, in effect, blocks in one of potentially multiple different blockchains across copies of the blockchain table. Each copy of the blockchain table may contain a same set of logical rows that are arranged in a respective copy of a blockchain of the blockchain table. The rows in a blockchain table are treated as immutable because modifying or deleting a row would invalidate the cryptographic hash value for that row and disrupt the continuity of the blockchain. Thus, conventional conflict resolution techniques used in active-active replication cannot be used with blockchain tables.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Disclosed herein are various approaches for supporting active-active replication in a blockchain table having a primary key constraint. Support for a primary key constraint may be implemented in a blockchain table using a non-unique index. The non-unique index may allow multiple rows with a same primary key value to exist together in a blockchain table.

One of the multiple rows is treated as the correct version of the row, and is referred to herein as the winning row. The winning row among these conflicting rows may be indicated using a visibility field in each row. The visibility field may be a system-managed hidden column in the blockchain table, and the visibility field may not be used to compute the cryptographic hash for a corresponding row. By default, each row's visibility field may indicate that the row is "visible", which may mean that the row may be considered during subsequent conflict resolutions. The visibility field is also used by conflict resolution logic to designate one or more "losing" rows among a plurality of conflicting rows as "invisible". If a row's visibility field indicates that the row is invisible, the row may not be considered during subsequent conflict resolutions. On the other hand, the visibility field of winning row from the plurality of conflicting rows may continue to indicate that the row is visible.

Example Database Management System

Figure 1:
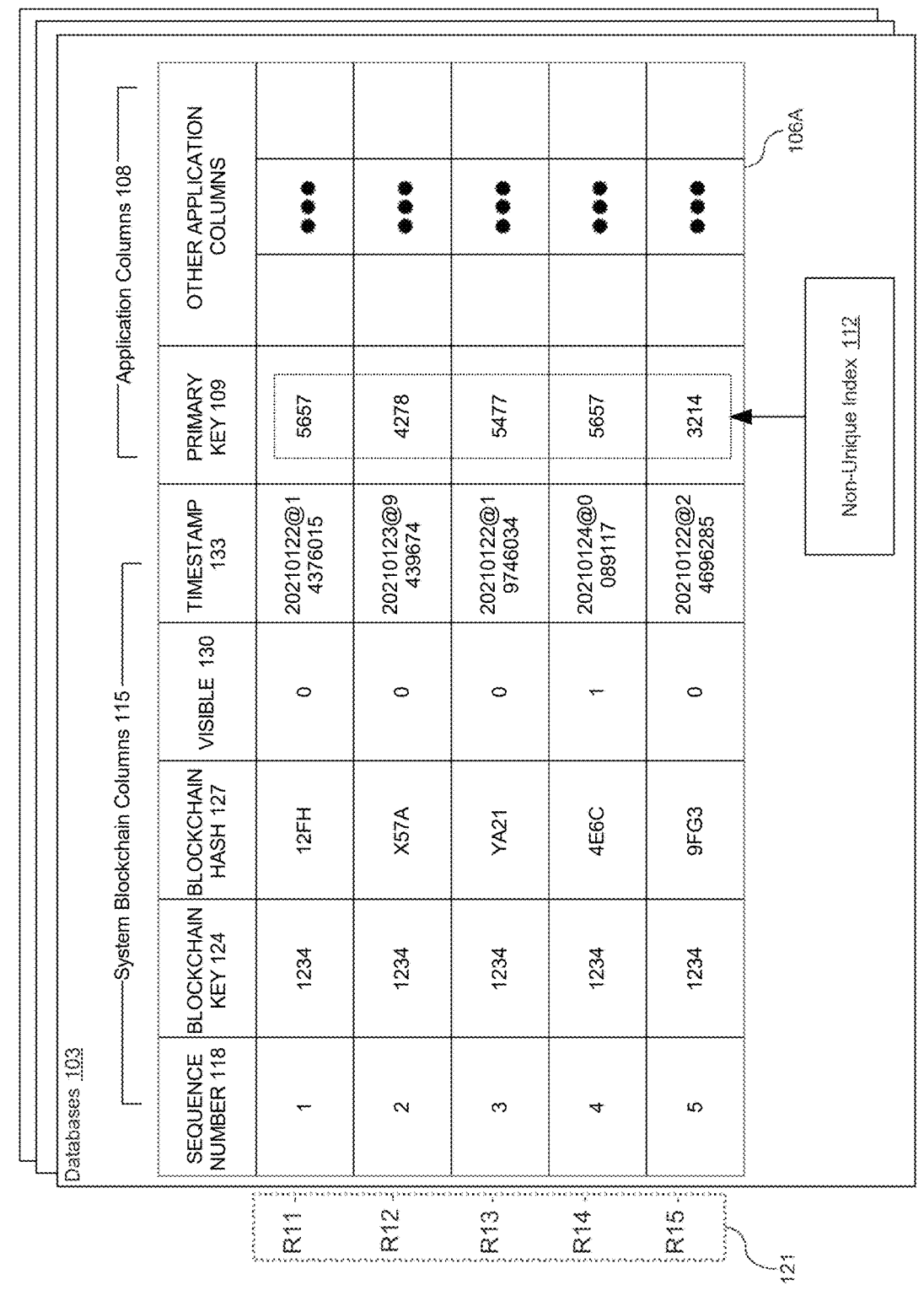
FIG. 1 is a block diagram that depicts an example of a DBMS, in an embodiment.

FIG. 1 is a block diagram that depicts an example of a DBMS 100, in an embodiment. The DBMS 100 includes and is hosted by at least one computer that may be a rack server such as a blade, a personal computer, a mainframe, a virtual computer, or other computing device.

The DBMS 100, such as a relational DBMS (RDBMS), contains a plurality of databases 103 (that make up a distributed database system. In an embodiment and according to a schema and/or database dictionary, a database 103 may contain at least one blockchain database object such as a blockchain table 106. The databases 103 and blockchain table 106A are exemplary. For purposes of exposition, the example of FIG. 1 depicts only five rows in the blockchain table 106A, which are designated as rows R11, R12, R13, R14, and R15. Each of the databases 103 may be replicas of each other and configured under an active-active replication scheme, as described in more detail below. In addition, any features of the blockchain table 106A or other components described below may likewise be implemented in any of the databases 103. In FIG. 1, the databases 103 are depicted as being managed by the DBMS 100. In some implementations, however, each of the databases 103 may be managed by a separate DBMS 100.

Turning now to the blockchain table 106A, the columns of the blockchain table 106A may comprise one or more application columns 108. The application columns 108 may be columns that a user may set directly in a row within a database transaction before committing the row in the database transaction. Specifically, users of the blockchain table 106A may set the column values of application columns 108 for a row within a database transaction by issuing database commands that specify database manipulation operations directed to any of application columns 108 within the database transaction, subject to a primary key constraint, which is discussed in greater detail below. An example of an application column for blockchain table 109 is a column for a dollar amount, a column for bank transaction data and time, and a column for bank transaction numbers.

The application columns 108 may include a PRIMARY KEY 109 column in addition to various other application columns. PRIMARY KEY 109 may hold primary key values. One of the application columns 108 may be designated as the PRIMARY KEY 109 column when the blockchain table 106A is created. A row's PRIMARY KEY 109 value serves as an identifier for that row.

A non-unique index 112 may be defined for the PRIMARY KEY 109 column. The non-unique index 112 may include a database index that enables look-up and retrieval of rows from the blockchain table 106A based on a PRIMARY KEY 109 value. The non-unique index 112 may permit multiple rows having a same PRIMARY KEY 109 to exist in the blockchain table 106A at once. In contrast to a conventional primary key, the non-unique index 112 may enable a row to be inserted into the blockchain table 106A by an apply engine during replication, even if the replicated row has a same PRIMARY KEY 109 value as an existing row. And even though a given PRIMARY KEY 109 value may not be unique, the PRIMARY KEY 109 value may, from a user's perspective, still function as a primary key. That is, a user may be unable to insert a new row into the blockchain table 106A having a same PRIMARY KEY 109 value as an existing row. Thus, in effect, the primary key constraint on the blockchain table 106A maybe active when a user attempts to insert a row into the blockchain table 106A, but the primary key constraint may be deactivated when the apply engine attempts to insert a row into the blockchain table 106A.

The blockchain table 106A may include system blockchain columns 115, which may be columns managed by the DBMS 100 to provide the blockchain table 106A with its blockchain properties and characteristics. Operations in which the system blockchain columns 115 may be populated and updated are described in detail below. These operations may be performed at commit time. Users of the blockchain table 106A may be incapable of changing a column value of any of the system blockchain columns 115 by issuing database manipulation (DML) commands directed to any of the system blockchain columns 115. The system blockchain columns 115 may, in some implementations, include columns beyond those included in the example of FIG. 1.

The column SEQUENCE NUMBER 118 may hold a sequence of numbers for a blockchain 121 stored in the blockchain table 106A. For example, a blockchain 121 comprising rows R11, R12, R13, R14, and R15 holds sequence number values 1, 2, 3, 4, and 5 in SEQUENCE NUMBER 118, respectively. A row in a blockchain 121 may be referred to as being the previous row to another row in the blockchain 121 when the row holds a sequence number that is previous to that of the other row; conversely, a row in a blockchain 121 may be referred to as the subsequent row to another row in the blockchain 121 when the row holds the sequence number that is subsequent to that of the other row. Thus, in the blockchain 121, row R12 is the previous row of row R13 and the subsequent row to row R11.

In some implementations, a blockchain table 106 may include multiple blockchains 121. Each blockchain 121 may correspond to a blockchain key value and may be referred to as a "user blockchain," as described in U.S. patent application Ser. No. 18/383,948, filed Oct. 26, 2023, which is incorporated herein by reference in its entirety. For purposes of exposition, the invention is described in the context of copies of blockchain tables 106 illustrated with user blockchains.

The column BLOCKCHAIN KEY 124 may hold blockchain key values. A blockchain 121 may comprise rows that contain the same BLOCKCHAIN KEY 124 value. The blockchain 121 may be associated with the DBMS 100. Rows R11, R12, R13, R14, and R15 which comprise the blockchain 121, hold the same the same value 1234 in BLOCKCHAIN KEY 124. Rows in a different blockchain 121, however, may hold a different value in the BLOCKCHAIN KEY 124 field.

When creating and/or altering the definition of a blockchain table, a column that comprises a BLOCKCHAIN KEY 124 value is specified. For example, a DDL command is issued to a DBMS to define a blockchain table, the DDL command identifying the table as a blockchain table and declaring or otherwise specifying a column that is a BLOCKCHAIN KEY 124. The definition of the blockchain table, and the column as a BLOCKCHAIN KEY 124, are stored in a database dictionary of the database managed by the DBMS.

A BLOCKCHAIN KEY 124 value may be a composite key comprised of multiple columns. The column values of a row of a composite BLOCKCHAIN KEY 124 may be referred to collectively as a BLOCKCHAIN KEY 124 value.

The column BLOCKCHAIN HASH 127 may hold cryptographic hash values that link rows in a blockchain 121. A BLOCKCHAIN HASH 127 value for a row in a blockchain 121 may be generated by applying a hash function to inputs that include column values of the row—excluding column values of VISIBLE 130, as discussed in more detail below— as well as the BLOCKCHAIN HASH 127 value held in a previous row. In an embodiment, the hash function may implement a secure hashing algorithm (SHA), such as SHA2-512.

The column TIMESTAMP 133 may hold time values indicating when a row was inserted in the blockchain table 106A. This may include when a row was inserted in the blockchain table 106A by a user or when a row is replicated in the blockchain table 106A. In an embodiment, for the rows of a given blockchain 121, the relative order of time values in TIMESTAMP 133 among the rows reflects the order of sequence numbers in SEQUENCE NUMBER 118 among the rows. In some implementations, the TIME-STAMP 133 column may be a system-managed hidden column and/or may not be used to compute the BLOCK-CHAIN HASH 127 value for each row in the blockchain table 106A.

Visibility of Rows in a Blockchain Table

The column VISIBLE 130 may be a system-managed hidden column that may only be modified internally, and not by a user of the blockchain table 106A. The value of VISIBLE 130 may be used to identify a winning row among a plurality of conflicting rows having a same PRIMARY KEY 109 value. That is, if the value of a row's VISIBLE 130 column is "visible", then that row is by default visible and may be considered the winning row among other conflicting rows. Likewise, if the value of a row's VISIBLE 130 column is "invisible", then that row is by default invisible and may be considered a losing row among any conflicting rows. In subsequent conflicts between rows having that same PRI-MARY KEY 109 value, any row having a VISIBLE 130 column set to "invisible" would not be considered when resolving those conflicts. Likewise, if a row is marked as "invisible", then that row does not represent a valid row with respect to its PRIMARY KEY 109 value.

The values included in VISIBLE 130 may be any values that indicate whether a particular row is visible or invisible, such as "1" for visible and "0" for invisible, "TRUE" for visible and "FALSE" for invisible, or any other suitable two-state values. For purposes of illustration and ease of explanation, however, if a row has a value of VISIBLE 130 indicating that the row is visible, then the value of that row's VISIBLE 130 column may be referred to as "visible". On the other hand, if a row has a value of VISIBLE 130 indicating that the row is invisible, then the value of that row's VISIBLE 130 column may be referred to as "invis-ible".

In some implementations, the default value of VISIBLE 130 for a row in the blockchain table 106A may be "visible". When a conflict between two or more rows is detected and resolved, the VISIBLE 130 for each conflicting row may be set to "invisible", except for that of the row determined to be the winning row of the conflict. Thus, once a conflict is resolved, only one of a plurality of conflicting rows may have a VISIBLE 130 column set to "visible"; the other conflicting rows may have VISIBLE 130 columns set to "invisible".

The VISIBLE 130 column may be excluded when com-puting a cryptographic hash for a row in the blockchain table 106A. Thus, the value of VISIBLE 130 for a row may be modified without affecting that row's BLOCKCHAIN HASH 127 value. So even if a row's VISIBLE 130 value is modified after the row's BLOCKCHAIN HASH 127 has been computed, that modification may not affect any sub-sequent hash verification of the BLOCKCHAIN HASH 127 value.

In some implementations, when a user performs a lookup by PRIMARY KEY 109 in the blockchain table 109, all rows having that PRIMARY KEY 109 may be returned, irrespec-tive of the value in each such row's VISIBLE 130 column. A user may likewise perform a lookup of rows in the blockchain table 109 based on the value of VISIBLE 130.

In other implementations, however, a view may be defined for the blockchain table 106A that may prevent any rows with VISIBLE 130 set to "invisible" from being returned in response to a query, even if those rows would otherwise be returned in response to that query. In some implementations, however, the DBMS 100 may support removing rows with VISIBLE 130 set to "invisible" from query results without defining a view. In that case, while retrieving rows that meet the condition(s) specified in a query, the DBMS 100 may "skip" any such row with a VISIBLE 130 set to "invisible".

Virtual private database (VPD) policies may restrict access to rows having VISIBLE 130 columns set to "invis-ible". VPD is a mechanism in a DBMS that restricts a user's access to records whose attributes or columns satisfy access conditions defined by a DBMS for that user. Typically, DBMS administrators establish the access conditions for an end user, which are transparently applied to database state-ments issued by the user. In some implementations, such an access condition may specify that users (or at least some users) may not access a row having a VISIBLE 130 column set to "invisible". In some implementations, an access condition may limit access to rows having VISIBLE 130 columns set to "invisible" to users having administrative or otherwise elevated access privileges.

Active-Active Replication Scheme

Figure 2:
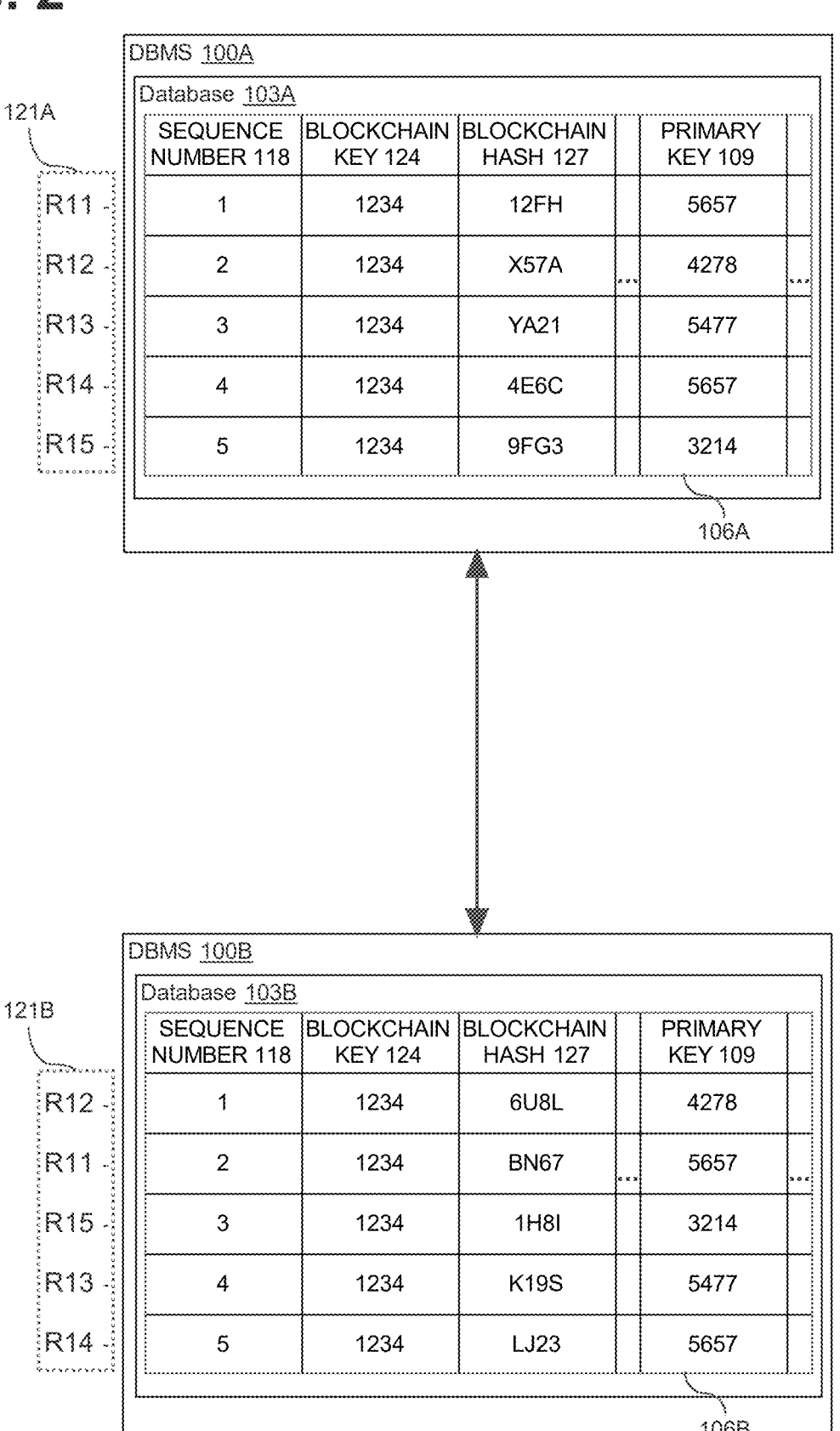
FIG. 2 is a block diagram than depicts an example of a two DBMSs configured within an active-active replication scheme, in an embodiment.

FIG. 2 is a block diagram than depicts an example of a two DBMSs 101, first DBMS 101A and a second DBMS 101B, configured within an active-active replication scheme, in an embodiment. While for the purposes of illustration, FIG. 2 depicts two DBMSs 100A and 100B, any number of DBMSs 100 may be configured within the active-active replication scheme as it is described herein. As in FIG. 1, each DBMS 100A and 100B may manage one or more databases 103, though the example of FIG. 2 shows a first database 103A of DMBS 100A and a second database 103 of DBMS 100B for purposes of illustration. Each database 103A and 103B can include one or more replicas of a blockchain table 106. In the example of FIG. 2, for purposes of illustration, the replica of blockchain table 106 within the first DBMS 100A is referred to as "first block-chain table 106A", while the replica of blockchain table 106 within the second DBMS 100B is referred to as "second blockchain table 106B". And while particular features may be described with relation to either the first blockchain table 106A or the second blockchain table 106B for purposes of illustration, both of the blockchain tables 106A and 106B may include those particular features.

The DBMSs 100A and 100B may be configured within a distributed active-active replication framework such that each of the databases 103A and 103B are replicas of each other. In this active-active replication framework, each DBMS 103A and 103B may function as both a source and a destination for replication, allowing bidirectional data propagation. Any data changes to the blockchain table 106 of one DBMS 100 made and committed as part of a database transaction may be disseminated to the other DBMS 100. Any suitable mechanism of replication that is compatible with the primary key constraint and other features described herein may be used. In addition, although the example of FIG. 2 shows two DBMSs 100, any number of DBMSs 100 may be configured under an active-active replication scheme as described herein.

Database 103A of DBMS 100A and database 103B of DBMS 100B may be replicas of each other. Thus, for each sequence number value in the SEQUENCE NUMBER 118 columns of the blockchain tables 106A and 106B, at least one row having that sequence number value in its SEQUENCE NUMBER 118 column may be stored in both of the databases 103A and 103B. Rows R11-R15 in both blockchain tables 106A and 106B may be a part of the blockchain 121. Rows R11-R15 in the second blockchain table 106B may also be ordered differently than in the first blockchain table 121A, although they may be assigned the same SEQUENCE NUMBER 118 values in both the first blockchain table 106A and the second blockchain table 106B.

Each of the blockchain tables 106A and 106B may be subject to a primary key constraint defined for the tables. The primary key constraint may be enforced when a user attempts to insert a new row into the first blockchain table 106A, if that new row has a same PRIMARY KEY 109 value as an existing row in first blockchain table 106A. The DBMS 100A may therefore return an error in response to this unsuccessful insertion attempt. The new row may therefore not be inserted into the first blockchain table 106A. A user may not have the option to disable enforcement of the primary key constraint in this case. On the other hand, if a new row having a particular PRIMARY KEY 109 value is successfully inserted into the second blockchain table 106B, that row may be replicated in the first blockchain table 106A even if the first blockchain table 106A already included a row having that same PRIMARY KEY VALUE 109. Thus, during replication, the primary key constraint may not be enforced. A user may not have the option to enable enforcement of the primary key constraint in this case. Thus, enforcement of the primary key constraint is managed solely by the DBMS 100A and is not configurable by a user.

Conflict Detection and Resolution

Figure 3:
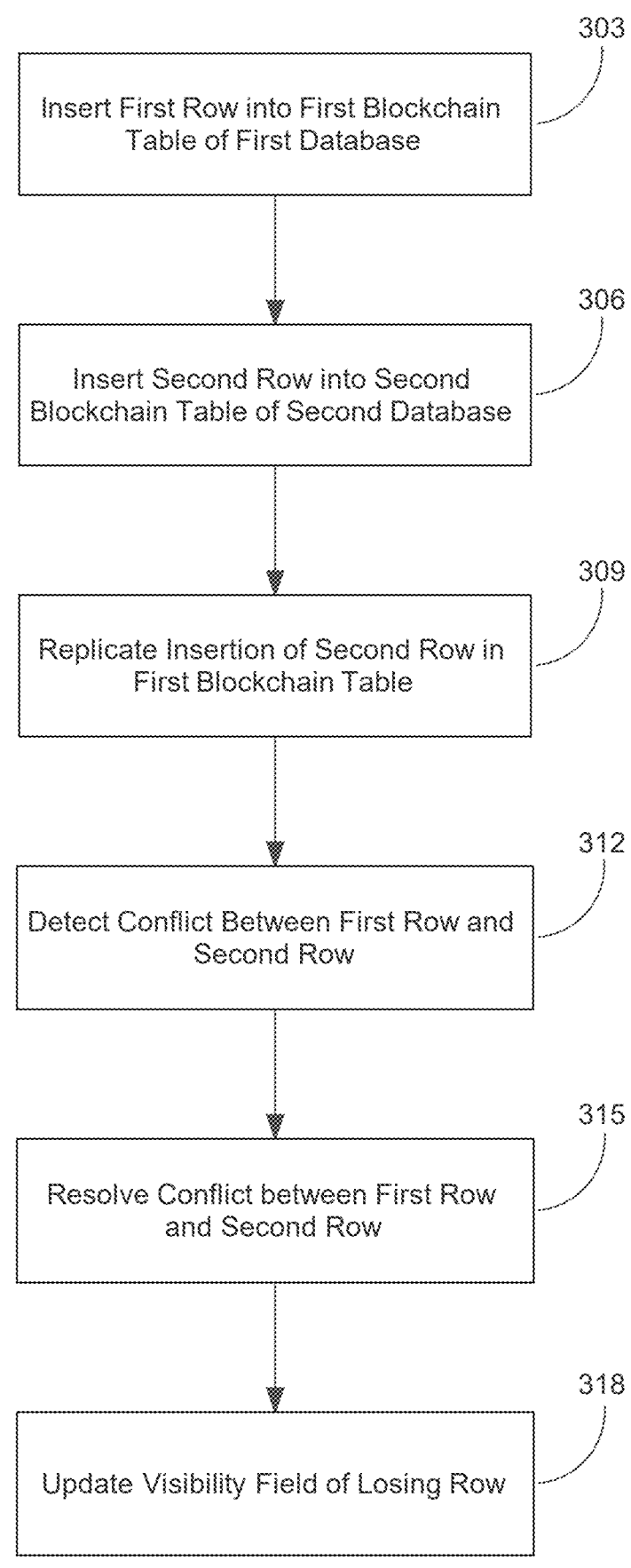
FIG. 3 is a flow diagram that depicts an example of a process for conflict detection and resolution in a blockchain table in an active-active replication scheme, in an embodiment.

FIG. 3 is a flow diagram that depicts an example of a process for conflict detection and resolution in a blockchain table 106 in an active-active replication scheme, in an embodiment. The flow diagram of FIG. 3 provides one example of a process implemented by the DBMS 100. The flow diagram of FIG. 3 provides merely an example of the many different types of functional arrangements that may be employed to implement the operation of the depicted portion of the DBMS 100.

At step 303, a first row is inserted in the first blockchain table 106A of the first database 103A. The first row may include a plurality of system blockchain columns 115, including a SEQUENCE NUMBER 118 column, a BLOCK-CHAIN KEY 124 column, a BLOCKCHAIN HASH 127 column, a VISIBLE 130 column, and a TIMESTAMP 133 column. When the first row is inserted into the first blockchain table 106A, the system blockchain columns 115 may be updated accordingly, as described in U.S. patent application Ser. No. 18/383,948.

In addition, the first row may include a plurality of application columns 108 including a PRIMARY KEY 109 column, which may serve as an identifier for the first row. A non-unique index 112 may be defined for the PRIMARY KEY 109 column of the first blockchain table 106A, which may enable another row having a same PRIMARY KEY 109 value as the first row to exist within the first blockchain table 106A.

At step 306, a second row is inserted in the second blockchain table 106B of the second database 103B. The second row may include a plurality of system blockchain columns 115, like those described step 303 with respect to the first row. When the second row is inserted into the second blockchain table 106B, the system blockchain columns 115 may be updated as described in U.S. patent application Ser. No. 18/383,948.

The second row may further include a plurality of application columns 108, similar to the first row. As with the first row, the application columns 108 in the second row may include a PRIMARY KEY 109 column, which may serve as an identifier for the second row. A non-unique index 112 may be defined for the PRIMARY KEY 109 column of the second blockchain table 106B, which may enable another row having a same PRIMARY KEY 109 value as the second row to exist within the second blockchain table 106B. In this example, the second row may have a same PRIMARY KEY 109 value as the first row.

At step 309, the second row may be replicated in the first blockchain table 106A in the first database 103A. Once the insertion of the second row into the second blockchain table 106B is committed, a process may be triggered to propagate the insertion of the second row from the second blockchain table 106B to the first blockchain table 106A. The content of the new row may be replicated in the first blockchain table 106A as-is. During replication, the BLOCKCHAIN HASH 127 value of the second row may be replicated and verified to ensure validity of data in the second row. Likewise, the first row is replicated in the second blockchain table 106B in the second database 103B.

At step 312, a conflict is detected between the first row and the second row in the first blockchain table 106A. In this example, the first row and the second row each have the same value for their PRIMARY KEY 109. A conflict is also detected between the first row and the second row in the second blockchain table 106B.

At step 315, the conflict between the first row and the second row in the first blockchain table 106A is resolved. To resolve the conflict, either the first row or the second row may be selected as a winning row of the conflict. To select a winning row, any suitable conflict resolution strategy may be applied. For example, the winning row may be the row with a latest timestamp value in that row's TIMESTAMP 133 field, which would indicate the row that was most recently inserted into a blockchain table 106. As another example, the winning row may be the row with an earliest timestamp value in that row's TIMESTAMP 133 field, which would indicate the row that was least recently inserted into a blockchain table 106. As an additional example, the winning row may be selected based on a prioritization scheme that assigns a priority to each database 103 in the active-active replication scheme; in that case, the row that originated in the database 103 that has the greatest priority may be selected as the winning row. For purposes of the example of FIG. 3, assume that the first row is selected as the winning row of the conflict. The conflict is resolved in a similar manner in the second blockchain table 106B.

At step 318, the value of VISIBLE 130 field in the second row of the first blockchain table 106A is set to "invisible". Because the first row was selected as the winning row of the conflict, the value of the first row's VISIBLE 130 field may remain set to "visible". Likewise, because the second row is considered the losing row of the conflict, its VISIBLE 130 field may be changed from "visible" to "invisible". The first row may therefore be the only row having its same PRIMARY KEY 109 value that is visible, although the second row remains in the first blockchain table 106A. Thus, in any subsequent conflicts involving rows having the same PRIMARY KEY 109 value as the first row, the first row would be considered when resolving that conflict, but the second row would not. In addition, the VISIBLE 130 field of the second row in the second blockchain table 106B may also be changed from "visible" to "invisible" and remain in the second blockchain table 106B.

DBMS Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however, the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

A database command may also be in the form of an API call. The call may include arguments that each specifies a respective parameter of the database command. The parameter may specify an operation, condition, and target that may be specified in a database statement. A parameter may specify, for example, a column, field, or attribute to project, group, aggregate, or define in a database object.

In a DOCS, a database command may be in the form of functions or object method calls that invoke CRUD (Create Read Update Delete) operations. Create, update, and delete operations are analogous to insert, update, and delete operations in DBMSs that support SQL. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements.

A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

When operations are referred to herein as being performed at commit time or as being commit time operations, the operations are performed in response to a request to commit a database transaction. DML commands may be auto-committed, that is, are committed in a database session without receiving another command that explicitly requests to begin and/or commit a database transaction. For DML commands that are auto-committed, the request to execute the DML command is also a request to commit the changes made for the DML command.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple databases, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e. java file) and the compiled version of the class (i.e. class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
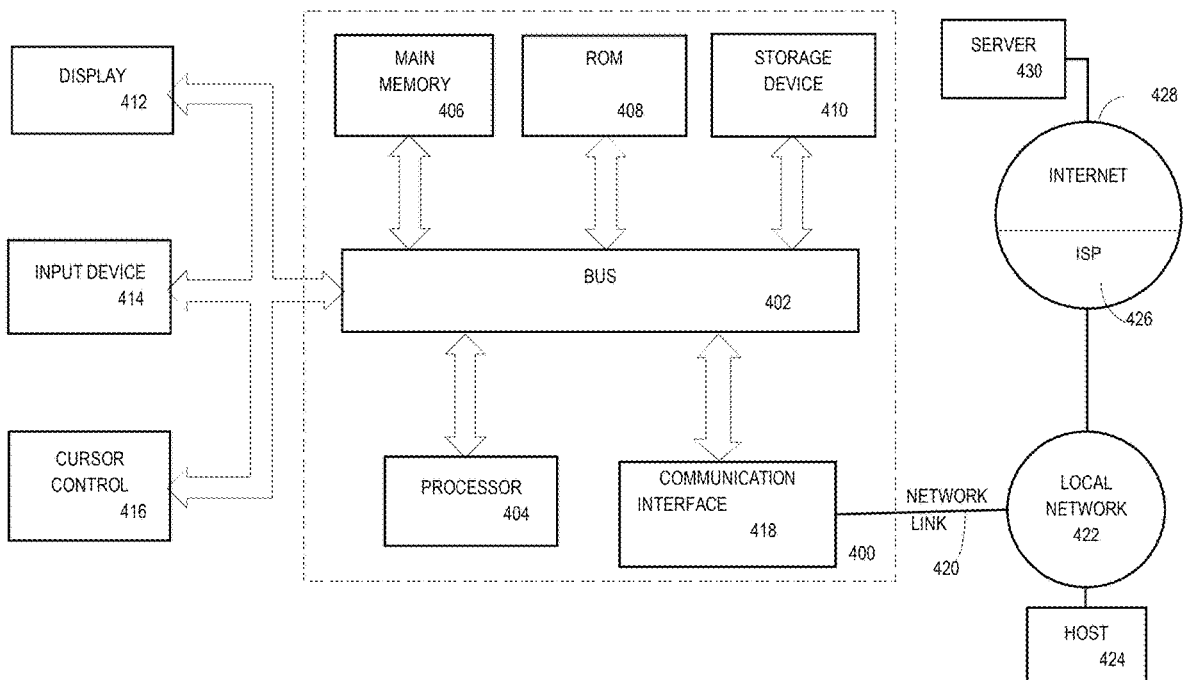
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
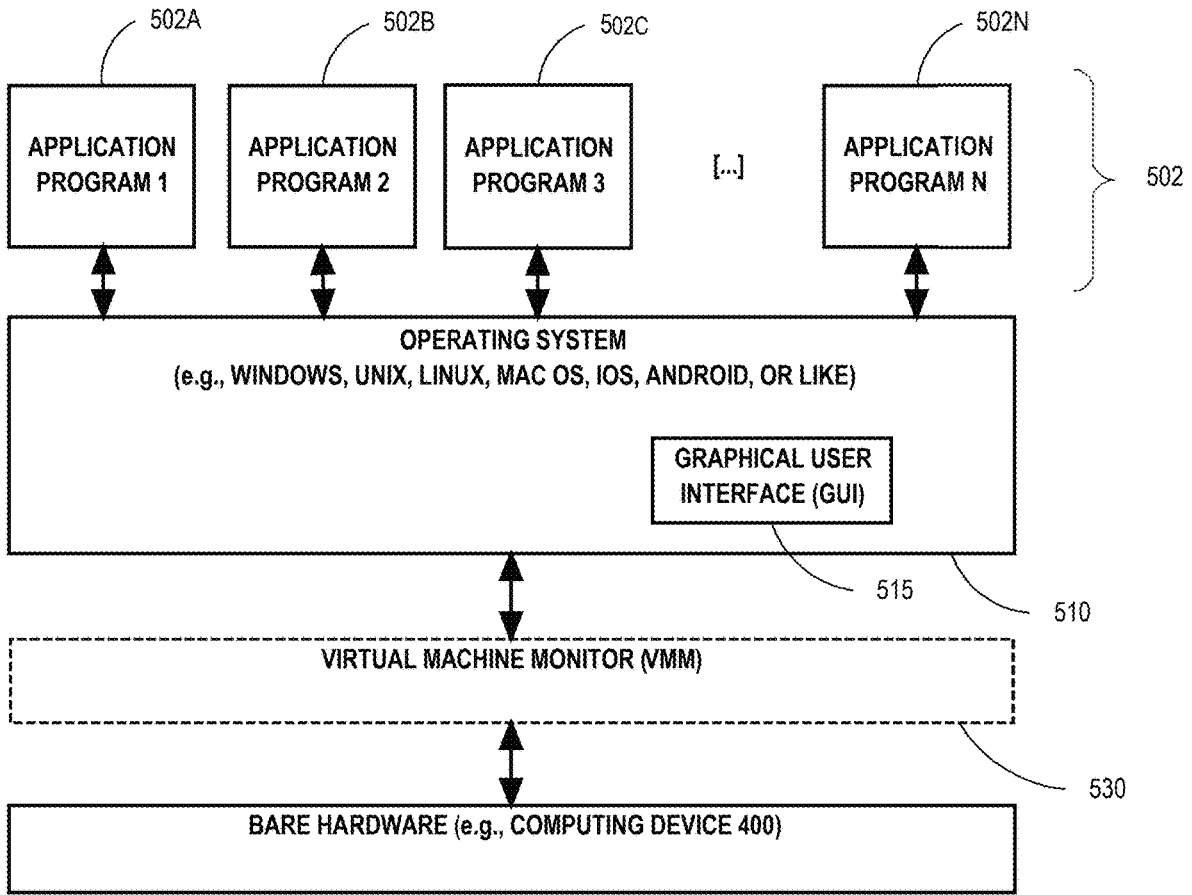
FIG. 5 is a block diagram of a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
storing a first blockchain database object in a first database, the first blockchain database object comprising:
a field defined as a primary key for the database object; and
a visibility field;
inserting a first record in the first blockchain database object, the first record comprising a particular value for the field designated as the primary key;
detecting a primary key value conflict between the first record and a second record from a second blockchain database object in a second database, the second record comprising the particular value for the field defined as the primary key, the second blockchain database object being maintained as a replica of said first blockchain database object;
implementing a conflict resolution procedure to determine that the first record is a winning record of the primary key value conflict between the first record and the second record; and
storing a visibility field within the second record to indicate that the second record does not represent a valid record with respect to the primary key;
wherein the method is performed by one or more computing devices.

2. The method of claim 1, wherein the first blockchain database object stores a plurality of blockchains, individual blockchains of the plurality of blockchains containing one or more records.

3. The method of claim 2, wherein the plurality of blockchains comprises a first blockchain and a second blockchain, the first blockchain containing the first record and the second blockchain containing the second record.

4. The method of claim 1, wherein the conflict resolution procedure comprises:

identifying a record having an earliest timestamp among a plurality of conflicting records;
identifying a record having a latest timestamp among the plurality of conflicting records; or
identifying a record having a highest priority among the plurality of conflicting records.

5. The method of claim 1, wherein the conflict between the first record and the second record is caused by both the first record comprising the particular value for the field designated as the primary key and the second record comprising the particular value for the field designated as the primary key.

6. The method of claim 1, further comprising defining a view associated with the first blockchain database object in the first database, the view causing the second record to be excluded, based on the value for the visibility field within the second record, from presentation in response to queries targeting the first record and the second record.

7. The method of claim 1, further comprising defining a default value for the visibility field, wherein the default value indicates that a record comprising the default value is included in the conflict resolution procedure.

8. The method of claim 1, wherein a non-unique index is defined on the primary key.

9. The method of claim 1, further comprising computing a cryptographic hash value for a blockchain hash field within the first record that excludes a value for the visibility field within the first record.

10. The method of claim 1, wherein the first blockchain database object further comprises at least one of a sequence number field, a blockchain hash field, a blockchain key field, or a timestamp field.

11. One or more non-transitory storage media storing instructions which, when executed by one or more computing devices, cause:
storing a first blockchain database object in a first database, the first blockchain database object comprising:
a field defined as a primary key for the database object; and
a visibility field;
inserting a first record in the first blockchain database object, the first record comprising a particular value for the field designated as the primary key;
detecting a primary key value conflict between the first record and a second row record from a second blockchain database object in a second database, the second record comprising the particular value for the field defined as the primary key, the second blockchain database object being maintained as a replica of said first blockchain database object;
implementing a conflict resolution procedure to determine that the first record is a winning record of the primary key value conflict between the first record and the second record; and
storing a visibility field within the second record to indicate that the second record does not represent a valid record with respect to the primary key.

12. The one or more non-transitory storage media of claim 11, wherein the first blockchain database object stores a plurality of blockchains, individual blockchains of the plurality of blockchains containing one or more records.

13. The one or more non-transitory storage media of claim 12, wherein the plurality of blockchains comprises a first blockchain associated with the first database and a second blockchain associated with the second database, the first blockchain containing the first record and the second blockchain containing the second record.

14. The one or more non-transitory storage media of claim 11, wherein the conflict resolution procedure comprises:

identifying a record having an earliest timestamp among a plurality of conflicting records;

identifying a record having a latest timestamp among the plurality of conflicting records; or identifying a record having a highest priority among the plurality of conflicting records.

15. The one or more non-transitory storage media of claim 11, wherein the conflict between the first record and the second record is caused by both the first record comprising the particular value for the field designated as the primary key and the second record comprising the particular value for the field designated as the primary key.

16. The one or more non-transitory storage media of claim 11, wherein the instructions, when executed by the one or more computing devices, further cause defining a view associated with the first blockchain database object in the first database, the view causing the second record to be excluded, based on the value for the visibility field within the second record, from presentation in response to queries targeting the first record and the second record.

17. The one or more non-transitory storage media of claim 11, wherein the instructions, when executed by the one or more computing devices, further cause defining a default value for the visibility field, wherein the default value indicates that a record comprising the default value is included in the conflict resolution procedure.

18. The one or more non-transitory storage media of claim 11, wherein a non-unique index is defined on the primary key.

19. The one or more non-transitory storage media of claim 11, wherein the instructions, when executed by the one or more computing devices, further cause computing a cryptographic hash value for a blockchain hash field within the first record that excludes a value for the visibility field within the first record.

20. The one or more non-transitory storage media of claim 11, wherein the first blockchain database object further comprises at least one of a sequence number field, a blockchain hash field, a blockchain key field, or a timestamp field.

* * * * *